March 10, 1936.   F. NALLINGER   2,033,731
MOTOR VEHICLE
Filed Sept. 11, 1934

Inventor

Patented Mar. 10, 1936

2,033,731

UNITED STATES PATENT OFFICE 2,033,731

MOTOR VEHICLE

Fritz Nallinger, Stuttgart, Germany, assignor to Daimler-Benz Aktiengesellschaft, Stuttgart-Unterturkheim, Germany, a company of Germany Application September 11, 1934, Serial No. 743,575
In Germany September 12, 1933

3 Claims. (Cl. 180—54)

Owing to the position of the rear motor in the back of the vehicle body, the engine and the cooling air surrounding the engine are in general bound to heat up to a greater extent than is the case with the engine mounted in front, even when special provision is made for as extensive a cooling of the engine as possible. If, therefore, the combustion air be taken as usual from the cooling air below the engine cover, considerable disadvantages occur, as, among other things, not only the engine becomes hotter, owing to the suction air being preheated, and the consequent difficulties are still further increased, but the admission to the engine is reduced, owing to the preheating.

For this reason the invention makes provision for a supply of combustion air for the engine, which is independent of the cooling air flowing round the engine itself, for instance after passing through the radiator. This independent supply may for instance be drawn by suction from the side wall of the coachwork and be conveyed to the engine by means of a separate passage. The air for the engine might, however, also be supplied through a central frame tube, from above or in any other suitable manner independently or at least partially independently of the cooling air.

Figure 1:
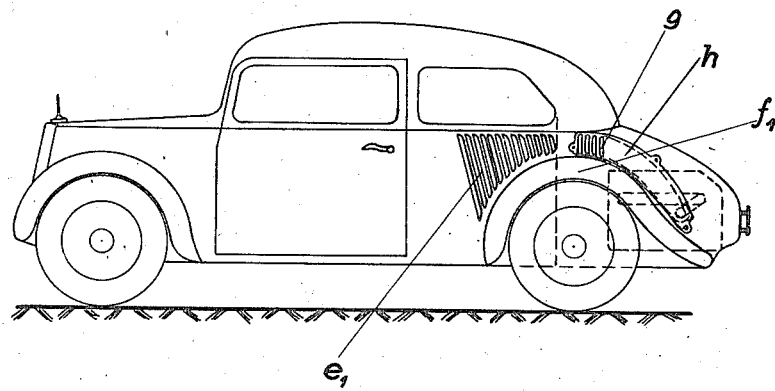
Figure 2:
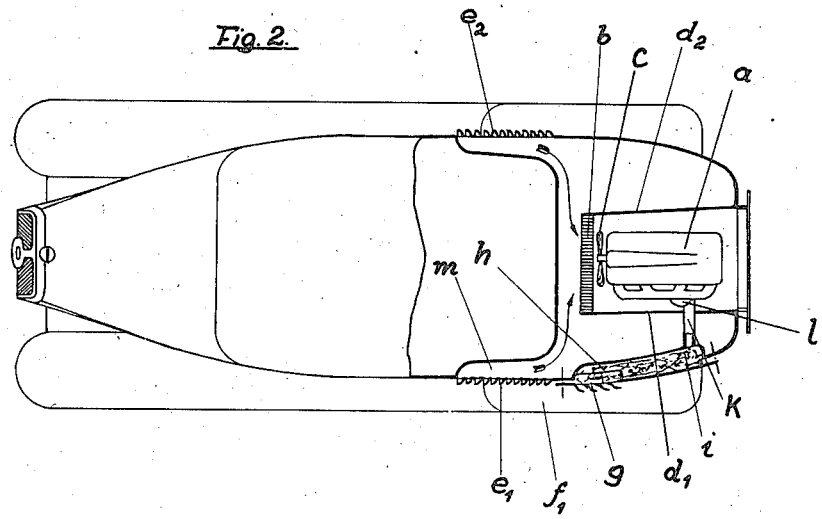

In the accompanying drawing a constructional example of the invention is shown in an elevation (Fig. 1) and a plan view (Fig. 2) of a vehicle.

$a$ is the rear engine, $b$ the radiator, through which the cooling air is driven by means of a fan $c$. The engine is mounted between two longitudinal bulkheads $d_1$ and $d_2$ which serve the purpose of guiding the cooling air, which enters through the gill-like slots $e_1$ and $e_2$ below the rear side windows, in as steady an air stream as possible past the engine.

Behind the gills $e_1$ for the admission of the cooling air some further gill openings $g$ for the combustion air are provided on one side of the vehicle above the mudguard $f_1$, the openings of which are directed rearwardly, so that the air can enter the openings only in the opposite direction to the direction of air stream and relative security as regards freedom from dust of the entering air is ensured. Immediately behind the openings which are arranged in a cover a filter $h$ may with advantage be provided, which is held in position for instance by a snap mechanism. From the gills $g$ a passage $i$ which is accessible from the outside, for instance by means of a cover, extends rearwards along the side wall of the coachwork above the mudguard or the wheel box where a transverse pipe $k$ branches off to the carburettor $l$ of the engine. The passages $i$ and $k$ may be entirely or partially lined with means for damping the noise caused by the suction.

Instead of the combustion air being taken directly from the outside, it might also be taken from the air passage $m$ leading from the openings $e_1$ or the like to the radiator, but in any case at a place where the stream of air has not yet passed through the radiator. Furthermore, change-over means may be provided, which operate in such a manner that for instance in the winter, when starting up or in other corresponding circumstances, it is possible to withdraw the combustion air from the stream of cooling air.

What I claim is:

1. In a motor vehicle including a coachwork, an engine disposed in the rear part of the coachwork, a cooling air passage for the engine, gill-like inlet openings for the cooling air passage in the side wall of the coachwork, a passage for the combustion air which is divided off from the cooling air passage and leads to the engine cylinders and gill-like inlet openings for the combustion air passage in the side wall of the coachwork the latter inlet openings being disposed behind the former inlet openings in the direction of travel.

2. In a motor vehicle including a coachwork, a rear mudguard, an engine disposed in the rear part of the coachwork, a cooling air passage for the engine, a combustion air passage divided off from the cooling air passage and leading to the engine cylinders, inlet openings for the cooling air passage at the outside of the coachwork, disposed substantially above the forward part of the rear mudguard, and inlet openings for the combustion air passage, disposed in the direction of travel behind the inlet openings for the cooling air above the rear mudguard.

3. In a motor vehicle including a coachwork, an engine disposed in the coachwork, a conduit for supplying combustion air to the engine, said conduit extending from the engine cylinders to the outer wall of the coachwork and for a portion of its length along said outer wall, said outer wall having an opening registering with the portion of the conduit extending along it, an apertured cover for said opening and filter means arranged in the portion of the conduit extending along the outer wall of the coachwork, said cover being removable so as to permit of access to the filter means.

FRITZ NALLINGER.